UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 718,670, dated January 20, 1903.

Original application filed August 28, 1893, Serial No. 484,234. Divided and this application filed June 19, 1895. Serial No. 553,301. (No specimens.)

*To all whom it may concern:*

Be it known that I, JOHN H. STEVENS, of the city of Newark, county of Essex, and State of New Jersey, have invented certain new and useful Improvements in Solvents for Pyroxylin Compounds, of which the following is a specification.

The compounds of pyroxylin to which the present invention is confined are used exclusively as imitations of various substances employed in the arts, such as horn, shell, marbles, linen, amber, vegetable epidermis, parchment, and the glazed or hard coating supplied by gum or oil varnishes. They are distinguished from other compounds of pyroxylin used in chemistry, blasting, gunnery, or surgery—such as photo emulsions, explosive gelatin, smokeless powder, and surgical collodion—because these latter compounds do not require the properties necessary in those used for the above-named imitations, and in many cases the defects pointed out in this specification to be avoided are valuable characteristics in the other compounds. As an instance, the porousness or hygroscopic character of a film is a defect in a film, but would be an advantage in some applications of collodion requiring porousness for the absorption of chemicals.

The compounds of this invention, as is well known, are composed of pyroxylin dissolved in or combined with suitable solvents. The solvents are of two kinds, liquid and solid. Ether-alcohol and methyl-alcohol are good examples of the liquid solvents, and ordinary gum-camphor is a solid solvent. The present invention relates solely to liquid solvents, and is a division of my application filed August 28, 1893, Serial No. 484,234. The compounds in which liquid solvents are employed generally require the use of compound solvents or solvents composed of two or more liquids which in combination have the necessary properties for the particular compound to be formed and used.

It has heretofore been the practice in forming compound solvents or solvent mixtures to prepare or procure the essential ingredients of the solvents and then combine them in suitable proportions. Although the use of mixtures of solvents has been productive of effects which were improvements over the use of simple substances separately, it has been attended with more or less difficulty, due especially to the different volatilities of the various constituent ingredients of the solvent mixture. Thus in a mixture of alcohol and ether the ether evaporates first, and if there be an excess of the alcohol there is a tendency to leave too much alcohol in combination with the pyroxylin, the alcohol being also weakened by the extra moisture either left from evaporating the solution or attracted to it from the atmosphere by condensation.

It is the object of the present invention to avoid many of these difficulties by producing a closer combination in a solvent mixture, so that the solvent will evaporate from the compound with greater regularity than is the case with the ordinary mixtures. At the same time I produce a series of compound solvents heretofore unknown, thus increasing the number of solvent substances for use in this art and permitting the operator to select from a large number of solvents possessing different properties.

I refer to the United States Patent No. 517,987, dated April 10, 1894, granted to me, for additional description of the state of the art and nature of the pyroxylin solvents.

In explaining the reaction which takes place during the formation of my solvent I would state that a simple ether may be defined as one in which two similar alcoholic radicals are connected by oxygen, thus:

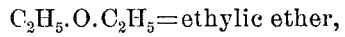

$C_2H_5.O.C_2H_5 =$ ethylic ether, and a mixed ether is one in which two dissimilar radicals are so connected, thus:

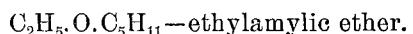

$C_2H_5.O.C_5H_{11}$—ethylamylic ether.

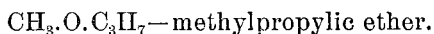

$CH_3.O.C_3H_7$—methylpropylic ether.

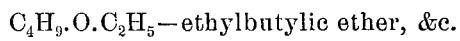

$C_4H_9.O.C_2H_5$—ethylbutylic ether, &c.

In the production of my mixed solvent the mixture of homologous monohydric alcohols represented by the typical formula

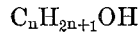

$$C_nH_{2n+1}OH$$

is heated with strong sulfuric acid with formation of an ethereal substituted sulfuric acid—that is, sulfuric acid in which one atom of hydrogen is replaced by an alcoholic radical:

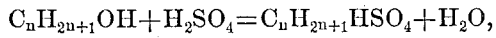

and as I employ a mixture of alcohols I obtain a mixture of such acid compounds. When a further quantity of alcohol is allowed to flow into the above-described mixture, the latter is decomposed with formation of ether and sulfuric acid:

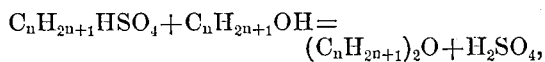

and by acting upon the acid mixture with a mixture of alcohols I produce both simple and mixed ethers.

In the final purification of my new solvent I do not attempt to remove free alcohols which may pass over with the ethers during the process of formation, for I find, as before described, that their presence is beneficial.

There is a class of liquid substances which while not in themselves useful solvents of pyroxylin are valuable by reason of their usefulness as diluents or by reason of their association with other solvents. They enable pyroxylin solutions to be diluted or rendered more fluid and impart important properties to the compounds through their association with the other ingredients of the solvent mixture. Prominent examples of such liquids are alcohol and fusel-oil. These non-solvent menstrua are very useful in connection with camphor, as they liquefy the camphor and enable it to act as a solvent at low temperatures. These diluents, however, though non-solvents in themselves, can be considered solvents in connection with other substances, as a useful diluent generally must either increase the solvent power of the mixtures or at least not impair it to any extent. The most prominent solvents, however, are those known as active solvents, or those capable of dissolving pyroxylin in the cold. Examples of these are wood-spirit, camphor-alcohol mixtures, and acetate of amyl.

The present invention furnishes not only active solvents of the pyroxylin in the cold or at ordinary atmospheric temperatures, but useful diluents, as hereinbefore described.

In carrying out my present invention I employ as solvents of pyroxylin the products obtained by subjecting a mixture of certain alcohols to the action of sulfuric acid in the ordinary process of etherification. By this means I obtain a mixture of ethers and other well-known substances, which in combination possess solvent powers different from the action of the separate substances and also obtain ethers and compounds useful as pyroxylin solvents and heretofore unknown to the art. Thus, for instance, in addition to the ordinary ethyl and amyl ethers I produce compound ethers, or what might be termed "ethylamylic ethers," and also by other reactions "methylamylic ethers" or "methylethylic ethers." The resultants of this method of producing solvents are extremely complex, and I have discovered that this complexity of composition is useful, as it is apparently the cause of the solvent action. For a non-solvent diluent I prefer to act on a mixture of alcohols containing mostly the higher alcohols of fusel-oil, and the result is a mixed product which is an improvement on the fusel-oil menstruum of my United States Patent No. 269,343.

The value of my invention will be appreciated when I call attention to the fact that many of the ethers obtained by subjecting the alcohols separately to the action of sulfuric acid are not in themselves solvents of pyroxylin.

In making my compound solvent I take a mixture of alcohols and subject it to the process of etherification well known to chemists and which is substantially used in the manufacture of ethyl oxid from ordinary ethyl-alcohol. The details of the process are too well known to require description; but I prefer to use the entire distillate of purified ethereal or alcoholic substances, as the special value of my solvent is due to its compound nature.

For a compound solvent which is to be used alone as a converting agent for the pyroxylin I employ mostly the product from the lighter alcohols, like methyl, ethyl, and propyl, although I have found it advantageous to use the whole series of alcohols, varying the proportions according to the result required.

I obtain a useful diluent for the other solvents and also for well-known solvents by having the compound ether consist principally of the result of acting on a mixture of the heavier alcohols, as before described.

One of the improved diluents of pyroxylin solvents is petroleum-naphtha or common benzin. In my United States Patent No. 478,543, of July 5, 1892, I have described the usefulness of benzin in this connection and the desirability of uniting it with such solvents as wood-spirit. The solvents produced according to the present method give improved results in connection with such mixtures as are described in United States Patent No. 478,543—that is, they permit of a closer union of methyl-alcohol and benzin. The action of the sulfuric acid on the different alcohols (methyl, ethyl, &c.) gives rise to products which form excellent combining agents for the benzin and ordinary methyl-alcohol or wood-spirit.

In using the compound solvents produced by the present method a knowledge of the art possessed by the skilled operator is all that is required to enable him to apply them to the products which it is desired to manufacture. In general, it is the practice to employ the solvent of such a nature and in such a proportion as to accomplish the various objects aimed at.

While I produce certain new combinations not known heretofore as pyroxylin solvents, it is nevertheless true that a great many substances resulting from the reactions I have described exist in the final compound solvent as separable bodies exerting their individual solvent powers in the well-known manner. For instance, in acting upon the ethyl-alcohol with sulfuric acid the result of the reaction is ethyl oxid, a well-known latent solvent. I recognize necessarily, therefore, that in my present compound solvent wherever ethyl oxid occurs I am employing an old well-known solvent, just as in the case of compounds at present used and which contain acetate of amyl the acetate of amyl is employed as a solvent to at least the extent of its presence. What I have discovered, however, is that the peculiar combinations constituting my new solvents make useful menstrua even when the separate constituent parts are inefficient. They can be employed alone or, especially in the case of the diluents, in useful combinations with other well-known solvents. In solid pyroxylin compounds either my active solvents or latent diluents form useful menstrua for the camphor, and in more fluid varieties of compounds the present solvents can be employed in connection with wood-spirit, acetone, acetate of amyl, and other solvents well known to the operator and used for the production of special results. I have found also that there are certain elements formed as a result of acting on the methyl-alcohol with sulfuric acid which are useful where it is desired to employ benzin or petroleum-naphtha in the mixture. The methyl-alcohol so acted on mixes readily with the benzin, whereas under ordinary circumstances benzin and wood-alcohol only mix in limited proportions; otherwise under such conditions as are disclosed in my United States Patent No. 478,543, dated July 5, 1892.

I do not here claim the manufacture or use of any one or more single ethers, alcohols, or other substances heretofore known as "menstrua," "solvents," or "diluents" in pyroxylin compounds, although, as hereinbefore described, such well-known menstrua may be present in my compound solvent, and I recognize the state of the art as disclosed in patents and other publications and the experience and knowledge of this manufacture.

I am aware that in acting on fusel-oil or a mixture of fusel-oil and benzin in the manufacture of acetate of amyl for use as a solvent according to my Patent No. 269,340 a mixture of non-solvent alcohols has been converted into mixed acetate ethers and that the presence of amyl acetate in such a mixture of ethers has caused them to be designated as "acetate of amyl" and employed as such in following my Patent No. 269,340. I am also aware that ethylmethyl ether has been made by etherifying a mixture of the corresponding alcohols with sulfuric acid.

I do not here claim the use of the ethers or esters known as "pyroxylin solvents," nor do I claim the manufacture of ethylmethyl or any compound ether, nor does any knowledge of the possible production of compound ethers convey any information as to their usefulness as solvents of pyroxylin, for this can only be ascertained by experiment.

The production of the present series of solvents is confined to acting on methyl and ethyl alcohols and those alcohols which are contained in the different fusel-oils in amounts sufficient for practical use. Outside of these limits, so far as I have as yet ascertained, the results would be inoperative.

What I claim, and desire to secure by Letters Patent, is—

1. The process of manufacturing pyroxylin compounds which consists in dissolving pyroxylin by means of a solvent resulting from the etherification of a mixture of alcohols with sulfuric acid, substantially as described.

2. The process of manufacturing pyroxylin compounds which consists in combining pyroxylin with a solvent composed in part of a solvent, or menstruum, resulting from the etherification of a mixture of alcohols with sulfuric acid, substantially as described.

3. As a new composition of matter, a compound containing pyroxylin and one or more of the solvents resulting from the etherification of a mixture of alcohols with sulfuric acid, substantially as described.

4. The improvement in the art of manufacturing pyroxylin compounds which consists in the admixture of one or more of the mixed alkyl oxids and pyroxylin, substantially as described.

5. The process of gelatinating soluble pyroxylin which consists in treating the soluble pyroxylin with a solvent that contains one or more of the mixed alkyl oxids, substantially as described.

6. A pyroxylin composition containing pyroxylin and one or more mixed alkyl oxids.

7. As a new article of manufacture, a liquid pyroxylin composition containing pyroxylin and one or more of the mixed alkyl oxids.

8. The improvement in the art of manufacturing pyroxylin compounds, which consists in dissolving or converting pyroxylin with the aid of the solvent action of a mixed ether, substantially as described.

9. A liquid pyroxylin solution containing pyroxylin dissolved in a mixed ether produced by the distillation of a mixture of alcohols with sulfuric acid.

10. The improvement in the art of manufacturing pyroxylin compounds which consists in dissolving or converting pyroxylin by the solvent action of a mixed ether, substantially as set forth.

In witness whereof I have hereunto signed my name this 17th day of June, 1895.

JOHN H. STEVENS.

In presence of—
ABRAHAM MANNERS,
F. WM. RAWK.